United States Patent
Schaetzer

[19]

[11] Patent Number: 5,935,274
[45] Date of Patent: Aug. 10, 1999

[54] MIXTURES OF MONOAZOPYRIDONE DYES

[75] Inventor: Jürgen Schaetzer, Rheinfelden, Germany

[73] Assignee: Ciba Specialty Chemicals Corporation, Tarrytown, N.Y.

[21] Appl. No.: 09/056,652

[22] Filed: Mar. 18, 1998

Related U.S. Application Data

[63] Continuation of application No. 08/752,300, Nov. 19, 1996, abandoned.

[30] Foreign Application Priority Data

Nov. 22, 1995 [CH] Switzerland ............................. 3305/95

[51] Int. Cl.⁶ ........................... C09B 67/00; C09B 29/42; D06P 1/18
[52] U.S. Cl. ........................................ 8/639; 8/662; 8/922
[58] Field of Search ................................. 8/639, 662, 922

[56] References Cited

U.S. PATENT DOCUMENTS

| | | | |
|---|---|---|---|
| 3,905,951 | 9/1975 | Berrie et al. | 260/156 |
| 5,102,425 | 4/1992 | Buhler et al. | 8/532 |
| 5,288,680 | 2/1994 | Binder et al. | 8/639 |

FOREIGN PATENT DOCUMENTS

| | | |
|---|---|---|
| 0085823 | 8/1983 | European Pat. Off. |
| 0378167 | 7/1990 | European Pat. Off. |
| 0440072 | 8/1991 | European Pat. Off. |
| 0441166 | 8/1991 | European Pat. Off. |
| 0641837 | 3/1995 | European Pat. Off. |

OTHER PUBLICATIONS

Chem. Abst. 99:214104e of EP 0085823 Aug. 1983.
Chem. Abst. 123:58728t of EP 0641837 Mar. 1995.

*Primary Examiner*—Margaret Einsmann
*Attorney, Agent, or Firm*—Kevin T. Mansfield; Jacob M. Levine; David R. Crichton

[57] ABSTRACT

Dye mixtures comprising:
A) a dye of the formula

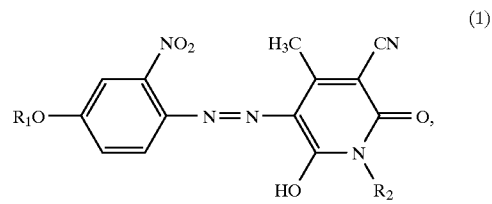

(1)

in which
$R_1$ is $C_1$–$C_4$alkyl,
$R_2$ is the radical $(CH_2)_nO$—$R_5$,
$R_5$, independently of $R_1$, is $C_1$–$C_4$alkyl and
n is the number 1, 2 or 3 and B) a dye of the formula

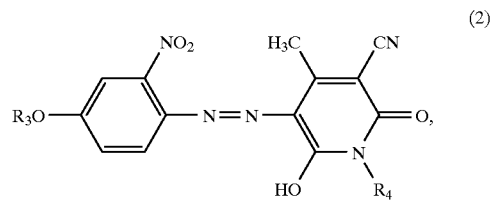

(2)

in which
$R_3$ and $R_4$ independently of one another are $C_1$–$C_4$alkyl, which are suitable for dyeing or printing textile fiber materials and give dyeings with good allround properties, are described.

11 Claims, No Drawings

MIXTURES OF MONOAZOPYRIDONE DYES

This application is a continuation of U.S. Pat. No. 08/752,300, filed Nov. 19, 1996, now abandoned.

The present invention relates to mixtures of monoazopyridone dyes, their preparation and their use for dyeing or printing textile fibre materials.

Monoazopyridone dyes and their use for dyeing synthetic fibre materials are known, for example, from EP-A-0 440 072. However, it has been found that these dyes do not always completely meet the highest demands. There is therefore a need for novel dyes or dye combinations which show, in particular, better exhaustion, build-up or wash-fastness properties.

It has now been found, surprisingly, that the mixtures according to the invention exhaust to a high degree on the fibres and are distinguished by a very good build-up and the resulting dyeings have good fastnesses to light, sublimation and washing.

The present invention thus relates to a dye mixture comprising:

A) a dye of the formula

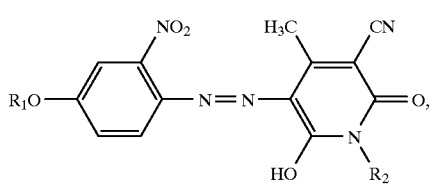

(1)

in which
$R_1$ is $C_1$–$C_4$alkyl,
$R_2$ is the radical $(CH_2)_nO$—$R_5$,
$R_5$, independently of $R_1$, is $C_1$–$C_4$alkyl and
n is the number 1, 2 or 3 and B) a dye of the formula

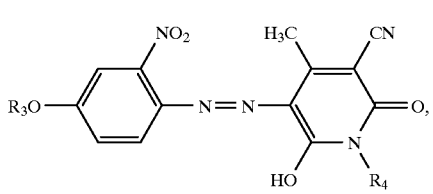

(2)

in which
$R_3$ and $R_4$ independently of one another are $C_1$–$C_4$alkyl.

$C_1$–$C_4$alkyl in the formulae (1) and (2) is methyl, ethyl, isopropyl, n-propyl, isobutyl, n-butyl, sec-butyl or tert-butyl.

Dye mixtures which are preferred are those comprising dyes of the formula (1) in which $R_1$ is methyl.

Dye mixtures which are furthermore preferred are those comprising dyes of the formula (1) in which $R_5$ is methyl, ethyl or isopropyl.

Dye mixtures which are likewise preferred are those comprising dyes of the formula (2) in which $R_3$ is methyl.

Dye mixtures which are furthermore preferred are those comprising dyes of the formula (2) in which $R_4$ is methyl or ethyl.

Dye mixtures which are particularly preferred are those comprising dyes of the formula (1) in which $R_1$ is methyl, $R_5$ is methyl, ethyl or isopropyl and n is 2 or 3.

Dye mixtures which are likewise particularly preferred are those comprising dyes of the formula (2) in which $R_3$ is methyl and $R_4$ is methyl or ethyl.

Dye mixtures which are especially preferred are those comprising dyes of the formula (1) in which $R_1$ is methyl, $R_5$ is methyl, ethyl or isopropyl, and n is 2 or 3 and dyes of the formula (2) in which $R_3$ is methyl and $R_4$ is methyl or ethyl.

The ratio of the dyes (A) and (B) in the dye mixtures according to the invention can vary within a wide range, for example from 5:1 up to 1:5. Dye mixtures which have a ratio of dyes (A) and (B) of 3:1 to 1:3 are preferred. Dye mixtures which comprise dyes (A) and (B) in the ratio of 1:1 are particularly preferred.

The following dye mixtures of dyes (A) of the formula (1) and (B) of the formula (2) listed in Table 1 are particularly preferred:

TABLE 1

| Dye mixture No. | Dye (A) of the formula (1) | | Dye (B) of the formula (2) | |
|---|---|---|---|---|
| | $R_1$ | $R_2$ | $R_3$ | $R_4$ |
| 1 | $CH_3$ | $(CH_2)_3OCH_3$ | $CH_3$ | $CH_3$ |
| 2 | $CH_3$ | $(CH_2)_3OC_2H_5$ | $CH_3$ | $CH_3$ |
| 3 | $CH_3$ | $(CH_2)_3OCH(CH_3)_2$ | $CH_3$ | $CH_3$ |
| 4 | $CH_3$ | $(CH_2)_3OCH_3$ | $CH_3$ | $CH_3$ |
| 5 | $CH_3$ | $(CH_2)_3OCH_3$ | $CH_3$ | $C_2H_5$ |
| 6 | $CH_3$ | $(CH_2)_3OC_2H_5$ | $CH_3$ | $C_2H_5$ |
| 7 | $CH_3$ | $(CH_2)_3OCH(CH_3)_2$ | $CH_3$ | $C_2H_5$ |
| 8 | $CH_3$ | $(CH_2)_3OCH_3$ | $CH_3$ | $C_2H_5$ |
| 9 | $CH_3$ | $(CH_2)_3OCH_3$ | $CH_3$ | $n$-$C_3H_7$ |
| 10 | $CH_3$ | $(CH_2)_3OCH_3$ | $CH_3$ | $n$-$C_4H_9$ |
| 11 | $CH_3$ | $(CH_2)_3OCH(CH_3)_2$ | $CH_3$ | $n$-$C_3H_7$ |
| 12 | $CH_3$ | $(CH_2)_3OCH(CH_3)_2$ | $CH_3$ | $n$-$C_4H_9$ |
| 13 | $CH_3$ | $(CH_2)_3OCH(CH_3)_2$ | $CH_3$ | $CH_2$—$CH(CH_3)_2$ |
| 14 | $C_2H_5$ | $(CH_2)_3OCH_3$ | $CH_3$ | $C_2H_5$ |
| 15 | $C_2H_5$ | $(CH_2)_3OCH(CH_3)_2$ | $CH_3$ | $C_2H_5$ |
| 16 | $CH_3$ | $(CH_2)_3OCH_3$ | $C_2H_5$ | $CH_3$ |
| 17 | $CH_3$ | $(CH_2)_3OCH(CH_3)_2$ | $C_2H_5$ | $C_2H_5$ |
| 18 | $CH_3$ | $(CH_2)_3OCH_3$ | $n$-$C_4H_9$ | $C_2H_5$ |
| 19 | $n$-$C_4H_9$ | $(CH_2)_3OCH_3$ | $CH_3$ | $C_2H_5$ |
| 20 | $C_2H_5$ | $(CH_2)_3OCH_3$ | $C_2H_5$ | $C_2H_5$ |

The present invention furthermore relates to a process for the preparation of the dye mixtures comprising the dyes of the formulae (1) and (2). The mixtures according to the invention can be prepared, for example, by mixing the dyes of the formulae (1) and (2) with one another in the desired ratio, or by diazotizing a diazo component of the formula

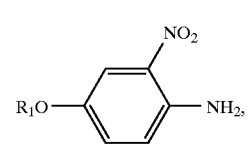

(3)

in which $R_1$ is $C_1$–$C_4$alkyl, and coupling the product to a mixture of two coupling components of the formulae

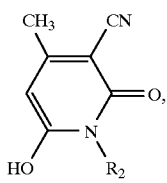

(4)

in which R₂ is as defined in formula (1), and

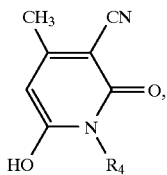

(4a)

in which R₄ is as defined in formula (2).

The dye mixtures according to the invention which comprise the dyes of the formulae (1) and (2) can be used for dyeing and printing semi-synthetic and, in particular, synthetic hydrophobic fibre materials, in particular textile materials. Textile materials of blend fabrics which comprise such semi-synthetic or synthetic hydrophobic textile materials can likewise be dyed or printed with the aid of the dye mixtures according to the invention.

Semi-synthetic textile materials are, in particular, cellulose 2½-acetate and cellulosetriacetate.

Synthetic hydrophobic textile materials comprise, in particular, linear, aromatic polyesters, for example those of terephthalic acid and glycols, in particular ethylene glycol, or condensation products of terephthalic acid and 1,4-bis-(hydroxymethyl)-cyclohexane; polycarbonates, for example those of α,α-dimethyl-4,4'-dihydroxy-diphenyl-methane and phosgene, and fibres based on polyvinyl chloride and polyamide.

The dye mixtures according to the invention are applied to the textile materials by known dyeing processes. For example, polyester fibre materials are dyed by the exhaust method from an aqueous dispersion in the presence of customary anionic or nonionic dispersants and, if appropriate, customary swelling agents (carriers) at temperatures between 80 and 140° C. Cellulose-2½-acetate is preferably dyed at between approximately 65 and 85° C., and cellulosetriacetate is dyed at temperatures up to 115° C.

The dye mixtures according to the invention do not stain or only slightly stain wool and cotton simultaneously present in the dyebath (very good reserve), so that they can also be used in particular for dyeing polyester/wool and polyester/cellulose fibre blend fabrics.

The dye mixtures according to the invention are suitable for dyeing by the thermosol method, in the exhaust method and for printing processes. The exhaust method is preferred. The liquor ratio depends on the apparatus circumstances, on the substrate and on the make-up. However, it can be chosen within a wide range, for example 1:4 to 1:100, but is preferably between 1:6 and 1:25.

The textile material mentioned can be present here in various forms of processing, for example as fibre, thread or non-woven and as a woven fabric or knitted fabric.

It is advantageous to convert the dye mixtures according to the invention into a dye preparation before their use. For this, the dye mixture is ground so that its particle size is on average between 0.1 and 10 microns. Grinding can be carried out in the presence of dispersants. For example, the dried dye mixture is ground with a dispersant or kneaded in paste form with a dispersant and then dried in vaccuo or by spraying. Printing pastes and dyebaths can be prepared with the preparations thus obtained, after addition of water.

In the case of printing, the customary thickeners, for example modified or non-modified natural products, for example alginates, British gum, gum arabic, crystal gum, carob bean flour, tragacanth, carboxymethylcellulose, hydroxyethylcellulose, starch or synthetic products, for example polyacrylamides, polyacrylic acid or copolymers thereof, or polyvinyl alcohols, are used.

The dye mixtures according to the invention impart to the materials mentioned, in particular polyester material, level yellow or golden yellow colour shades of very good in-use fastness properties, such as, in particular, good fastness to light and good fastness to sublimation. The very good fastness to washing is to be emphasised. The dyes according to the invention are furthermore distinguished by a good exhaustion and build-up.

The dye mixtures according to the invention can also be used in particular for the preparation of mixed shades together with other dyes or together with a suitable red and blue dye for trichromatic dyeing.

The present invention also relates to the abovementioned uses of the dye mixtures according to the invention, as well as a process for dyeing or printing semi-synthetic or synthetic hydrophobic fibre material, in particular textile material, which comprises applying the dye mixture according to the invention to the material mentioned or incorporating it into this. The hydrophobic fibre material mentioned is preferably textile polyester material. Other substrates which can be treated by the process according to the invention and preferred process conditions are to be found above in the more detailed explanation of the use of the dye mixtures according to the invention.

The invention also relates to the hydrophobic fibre material, preferably polyester textile material, dyed or printed by the process mentioned.

The following examples serve to illustrate the invention. In these, unless stated otherwise, parts are parts by weight and percentages are percentages by weight. The temperatures are stated in degrees Celsius. Parts by weight bear the same relation to parts by volume as the gram to the cubic centimetre.

EXAMPLE 1

A suspension of 33.6 parts of 2-nitro-4-methoxyaniline in 220 parts of water is cooled to about 10–15° C., and 60 parts of 32% hydrochloric acid are added dropwise. 55 parts of a 4N sodium nitrite solution are then added in the course of 15 minutes, with thorough stirring, the temperature of the reaction mixture being kept at about 15° C. When the addition has ended, the mixture is subsequently stirred for a further hour and the excess nitrite is destroyed with a little amidosulphonic acid. The resulting diazotization mixture is allowed to run slowly into a solution, cooled to about 5–10° C., of 20.7 parts of N-ethyl-3-cyan-4-methyl-5-hydroxypyridone, 24.3 parts of N-isopropoxypropyl-3-cyan-4methyl-5-hydropyridone and 16.3 parts of a 30% aqueous sodium hydroxide solution in 200 parts of water. During the addition of the diazotization mixture, the pH is kept constant at between 5 and 6 with a 30% aqueous sodium hydroxide solution. The orange-red suspension is subsequently stirred at 15–20° C. for about a further hour. The precipitate is filtered off with suction, rinsed with water and dried at 70° C. in vaccuo. 78.4 parts of dye mixture No. 7 are obtained. The dye mixture dyes polyester in brilliant golden yellow shades with good fastnesses, in particular with very good fastnesses to washing.

EXAMPLE 2

The dye mixtures 1–6 and 8–20 listed as priority in Table 1, which likewise dye polyester in brilliant golden yellow shades with good fastness properties, in particularly very good fastnesses to washing, are obtained analogously to the process described in Example 1 or by mixing two dyes of the formulae (1) and (2).

EXAMPLE 3

100 g of polyester fabric are immersed at a liquor ratio of 1:20 in a liquor comprising 1 g of dye mixture No. 7,
1 g/l of ammonium sulphate and
0,5 g/l of a commercially available levelling agent, which has been adjusted to pH 4.5 –5 with 80% formic acid, at room temperature. The liquor is then heated up, first to 60° C. at a heating up rate of 3° C./minute and then to 130° C. with a heating-up rate of 2° C./minute.

Dyeing is carried out at 130° C. for 60 minutes. The liquor is then cooled to 40° C. and the dyed polyester fabric is washed with water and cleaned reductively in a bath comprising 5 ml/l of 30% sodium hydroxide solution, 2 g/l of 85% sodium dithionite solution and 1 g/l of a commercially available detergent at 70–80° C. for 20 minutes. The finished dyeing is then washed with water and dried. A brilliant golden yellow dyeing with excellent fastnesses to washing is obtained.

What is claimed is:

1. A dye mixture comprising:
    A) a dye of the formula (1)

in which
    $R_1$ is $C_1$–$C_4$alkyl,
    $R_2$ is the radical $(CH_2)_nO$—$R_5$,
    $R_5$, independently of $R_1$, is $C_1$–$C_4$alkyl and
    n is the number 1, 2 or 3 and
    B) a dye of the formula (2)

in which
    $R_3$ and $R_4$ independently of one another are $C_1$–$C_4$alkyl, wherein said dye mixture contains said dye of formula (1) and said dye of formula (2) in a ratio of from about 5:1 to about 1:5.

2. A dye mixture according to claim 1, in which $R_1$ is methyl.

3. A dye mixture according to claim 1, in which $R_4$ is methyl or ethyl.

4. A dye mixture according to claim 1, in which $R_3$ is methyl.

5. A dye mixture according to claim 1, in which $R_5$ is methyl, ethyl or isopropyl.

6. A dye mixture according to claim 1, in which $R_1$ and $R_3$ are methyl, $R_4$ is methyl or ethyl, $R_5$ is methyl, ethyl or isopropyl and n is 2 or 3.

7. A dye mixture according to claim 1, in which the ratio of the dyes of the formula (1) and (2) is 3:1 to 1:3.

8. A process for the preparation of a dye mixture according to claim 1, which comprises diazotizing a diazo component of the formula (3)

in which $R_1$ is $C_1$–$C_4$alkyl, and coupling the product to a mixture of two coupling components of the formulae (4)

in which $R_2$ is the radical $(CH_2)_nO$—$R_5$,
    $R_5$ is $C_1$ –$C_4$alkyl and
    n is the number 1, 2 or 3, and (4a)

in which $R_4$ is $C_1$–$C_4$alkyl.

9. A process for dyeing or printing semi-synthetic or synthetic hydrophobic fibre material, which process comprises applying to, or incorporating into, the material a dye mixture according to claim 1.

10. A process according to claim 9, wherein a semi-synthetic or synthetic hydrophobic fibre material is a textile material.

11. A hydrophobic fibre material, dyed or printed according to claim 9.

* * * * *